(12) United States Patent
Demay et al.

(10) Patent No.: US 6,557,339 B2
(45) Date of Patent: May 6, 2003

(54) BLANKING-CAP SYSTEM FOR AN ORIFICE OF A CONDUIT, IN PARTICULAR FOR AN ORIFICE OF AN AIR-INTAKE DUCT INTO THE COMBUSTION CHAMBER OF A RAMJET

(75) Inventors: Jean-Paul Demay, Fresnes (FR); Laurent Carton, Saint-Florent sur Cher (FR)

(73) Assignee: Aerospatiale Matra Missiles, Paris (FR)

( * ) Notice: Subject to any disclaimer, the term of this patent is extended or adjusted under 35 U.S.C. 154(b) by 37 days.

(21) Appl. No.: 09/924,457

(22) Filed: Aug. 9, 2001

(65) Prior Publication Data

US 2002/0023428 A1 Feb. 28, 2002

(30) Foreign Application Priority Data

Aug. 28, 2000 (FR) .............................................. 0010983

(51) Int. Cl.$^7$ ................................................. F02K 7/18
(52) U.S. Cl. ........................................ 60/245; 60/267
(58) Field of Search ......................... 60/225, 244, 245, 60/767, 768

(56) References Cited

U.S. PATENT DOCUMENTS

| | | | | |
|---|---|---|---|---|
| 3,038,303 A | * | 6/1962 | Gose | 60/254 |
| 3,535,881 A | * | 10/1970 | Schubert | 60/245 |
| 3,768,255 A | * | 10/1973 | Barnes et al. | 60/245 |
| 3,901,028 A | * | 8/1975 | Leingang | 60/245 |
| 3,938,764 A | * | 2/1976 | McIntyre et al. | 244/117 R |
| 4,028,886 A | | 6/1977 | Hackett | 60/245 |
| 4,391,094 A | | 7/1983 | Engel et al. | 60/245 |
| 4,441,312 A | * | 4/1984 | Smith | 60/245 |
| 5,784,877 A | * | 7/1998 | Hewitt | 60/245 |
| 6,116,019 A | * | 9/2000 | Hallais et al. | 60/245 |

FOREIGN PATENT DOCUMENTS

| | | |
|---|---|---|
| FR | 2474594 | 1/1981 |
| GB | 1378079 | * 12/1974 |
| GB | 2068090 | 1/1980 |

* cited by examiner

Primary Examiner—Ted Kim
(74) Attorney, Agent, or Firm—Stevens, Davis, Millen & Mosher, LLP

(57) ABSTRACT

Blanking-cap system for an orifice of a duct, in particular for an orifice of an air-intake duct into the combustion chamber of a ramjet.

The blanking-cap system (16) includes a glass blanking cap (15) and a destruction device (17) which comprises a projectile (18) capable of destroying the blanking cap (15), and a controllable projection means (19), which is capable of projecting the said projectile (18) and which is arranged outside the conduit (7) while being oriented in such a way as to be able to project the said projectile (18) onto the said blanking cap (15).

10 Claims, 2 Drawing Sheets

BLANKING-CAP SYSTEM FOR AN ORIFICE OF A CONDUIT, IN PARTICULAR FOR AN ORIFICE OF AN AIR-INTAKE DUCT INTO THE COMBUSTION CHAMBER OF A RAMJET

The invention relates to a blanking-cap system for a conduit. Although not exclusively, it relates more particularly to a blanking-cap system for an orifice of an air-intake duct into the combustion chamber of a ramjet.

It is known that ramjets consist essentially of a combustion chamber, terminating in an ejection nozzle and into which liquid or gaseous fuel (possibly being obtained from a solid fuel) and combustion air are introduced. This combustion air is introduced into the said combustion chamber through at least one air-intake duct, of the air-scoop type, which traps the air when the said ramjet (or the flying object which carries it) moves with respect to the surrounding air.

Thus, the functioning of a ramjet requires that the said ramjet be speeded up beforehand with respect to the said surrounding air.

To do this, it is usual, in an initial operating phase corresponding to the speeding-up of the said ramjet, to make it operate as a rocket, by virtue of a consumable auxiliary thruster arranged in the said combustion chamber, then, when the said ramjet has reached a predetermined speed and when the said auxiliary thruster has been completely consumed, ramjet operation proper starts, with injection of fuel and of combustion air into the combustion chamber.

Such dual-mode operation (rocket mode, then ramjet mode) demands that a blanking-cap system be provided in order, on the one hand, to blank off an orifice of the said air-intake duct or air scoop during operation as a rocket, in order to prevent leakage, through the said orifice, of the gases generated by the said consumable auxiliary thruster and, on the other hand, to open the said orifice of the air-intake duct or air scoop for operation as a ramjet proper.

It is known to use a swinging hatch, with controlled opening, as blanking-cap system. However, in this case, a particularly sophisticated control system has to be provided, preventing any inadvertent opening of the hatch, which could entail premature firing of the said consumable auxiliary thruster and, consequently, damaging the carrier (aircraft for example) of a missile equipped with the said ramjet. Moreover, above all, this hatch remains present on board the ramjet after the air-intake duct has been opened, which, needless to say, poses problems of bulk and entails the presence of a parasitic mass during ramjet operation.

In order at least partially to remedy this latter drawback, the document FR-2 474 594 describes a blanking-cap system for a combustion-air intake orifice into the combustion chamber of a ramjet, which includes:

a blanking cap or cover made of glass, which completely blanks off the said orifice during the initial phase; and a destruction device, namely a mechanical percussion device, which destroys this glass blanking cap before ramjet operation. Upon this destruction, the glass blanking cap is broken up into small fragments. As the orifice is located downstream of the air scoop and corresponds to the feed opening into the combustion chamber, these fragments are ejected outwards, rearwards, passing through the combustion chamber and the thrust nozzle.

Consequently, the blanking cap is completely eliminated during ramjet operation.

However, the use of a mechanical percussion device, especially comprising a piston and a striker terminating in a point, exhibits a few drawbacks.

This is because:

either this percussion device acts frontally on the blanking cap, in order to be able to break it easily.

However, in order to obtain such frontal action, it is necessary to arrange the blanking cap in the air-intake duct, such that it then disturbs the airflow in ramjet operation;

or the percussion device is arranged outside the said air-intake duct.

However, in this case, it can only act laterally on the blanking cap, which reduces the effectiveness of this destruction device, since it is much more difficult to break the glass, and above all to break it completely, from such a position.

The object of the present invention is to remedy these drawbacks. It relates to a blanking-cap system for an orifice of a conduit, in particular for an orifice of an air-intake duct into the combustion chamber of a ramjet, which makes it possible:

to open the said orifice of the conduit effectively at a defined instant; and to free the said conduit completely after the orifice has been opened.

To that end, according to the invention, the said blanking-cap system for a conduit, of the type including:

at least one glass blanking cap capable of completely blanking off the said conduit; and at least one device for destroying the said glass blanking cap, is noteworthy in that the said destruction device comprises:

at least one projectile which is capable of destroying the said glass blanking cap when it is projected onto it; and a controllable projection means, which is capable of projecting the said projectile and which is arranged outside the said conduit while being oriented in such a way as to be able to project the said projectile onto the said blanking cap.

Thus, by virtue of the invention:

as the projection means is arranged outside the conduit, it does not impede the airflow after the opening of the orifice (in ramjet mode, for example), the said conduit being completely freed; and as the destruction means comprises the projection of a projectile, the glass blanking cap can be destroyed effectively and completely, despite the distance to the projection means and its being arranged outside the said conduit.

Moreover, by virtue of the invention, the projection means can be oriented in such a way that the impact of the projectile on the blanking cap is situated at a spot where complete destruction is facilitated, especially at the most fragile spot on the glass blanking cap, generally in the center thereof, which makes it possible to enhance and to optimize the effectiveness of the destruction.

Consequently, in the particular case of a ramjet, the entire blanking cap is eliminated during ramjet operation, which makes it possible to remedy the drawbacks of bulk and of parasitic mass mentioned above.

In order to optimize the precision of the impact of the projectile on the blanking cap and thus to enhance the effectiveness of the destruction thereof, advantageously, the blanking-cap system in accordance with the invention further includes a straight-line guide for guiding the said projectile, the straight-line guide being produced in the form of a channel, one end of which is situated facing the said projection means and the other end of which is directed towards the said blanking cap.

In the context of the present invention, the projection means, the projectile and the glass of the blanking cap can be produced according to various ordinary embodiments.

However, preferably,:

the said projection means is a pyrotechnic striker;

the said projectile is a bullet (pointed) with a conical, metal head; and the said blanking cap comprises toughened glass exhibiting a rupture stress of at least 190 Mpa.

It will be noted that the blanking-cap system in accordance with the invention can be employed on various types of conduits, the opening or the unblanking of which must be carried out in the operational environment. This implementation is possible especially by virtue of the abovementioned characteristics of the blanking cap, since it is possible to choose a glass which is capable of withstanding the mechanical, thermal, vibratory and/or electromagnetic stresses likely to be encountered for these various types of conduits.

In one preferred application, the blanking-cap system in accordance with the invention is intended to blank off an orifice of a combustion-air intake duct into the combustion chamber of a ramjet, the said ramjet being capable, in a known way, in an initial phase of operation corresponding to the speeding-up of the said ramjet, of operating as a rocket by virtue of a consumable auxiliary thruster arranged in the said combustion chamber, then, when the said ramjet reaches a predetermined speed, of operating as a ramjet proper with injection of fuel and of combustion air into the said combustion chamber, and the said blanking-cap system including, in a known way:

at least one glass blanking cap capable of completely blanking off the said orifice, during the said initial phase of operation as a rocket; and at least one destruction device capable of destroying the said glass blanking cap so as to open the said orifice for operation as a ramjet.

According to the invention, the said blanking-cap system is noteworthy in that, in addition to the abovementioned characteristics (relating to the destruction device and the glass blanking cap), the said blanking cap blanks off the inlet orifice into the air-intake duct, upstream thereof in the direction of flow of the air into the said air-intake duct.

Thus, as the projection means is situated within the ramjet, in the region of the air-intake duct (air scoop), but outside it, the projectile ejected by the projection means is, after destruction of the blanking cap, ejected directly out of the ramjet and of the flying machine (missiles, etc.) equipped with this ramjet. Consequently, there is no risk of the said projectile damaging the said ramjet or the said flying machine.

Moreover, since, upon the impact on the blanking cap, the projectile loses a great deal of energy, it is no longer dangerous, after it has been ejected out of the ramjet, for objects (another missile, for example) or persons present in the immediate environment of the said ramjet.

Advantageously, the said blanking cap corresponds to an extension of the outer wall of the ramjet in the region of the said inlet orifice.

Thus, during the initial phase before the change to ramjet operation, as the inlet orifice into the air-intake duct is blanked off and as the blanking cap forms a geometric continuity with the outer wall of the ramjet, the air which slips along this wall also slips along the outer face of the blanking cap, without being disturbed in its flow, which makes it possible particularly to reduce drag.

Advantageously, moreover, the blanking-cap system in accordance with the invention includes at least one fixing means made of elastic material, preferably of rubber, for fixing the said blanking cap onto the said orifice, which makes it possible to damp vibration (due especially to shocks).

Thus, by virtue of this reduction in vibration, it is possible to provide for a lesser thickness of fairing lip (in the region of the said orifice) for fixing the blanking cap.

The invention also relates to a ramjet equipped with a blanking-cap system as mentioned above, as well as a missile comprising such a ramjet.

The figures of the attached drawing will give a good understanding of how the invention can be produced. In these figures, identical references designate similar elements.

Figure 1:
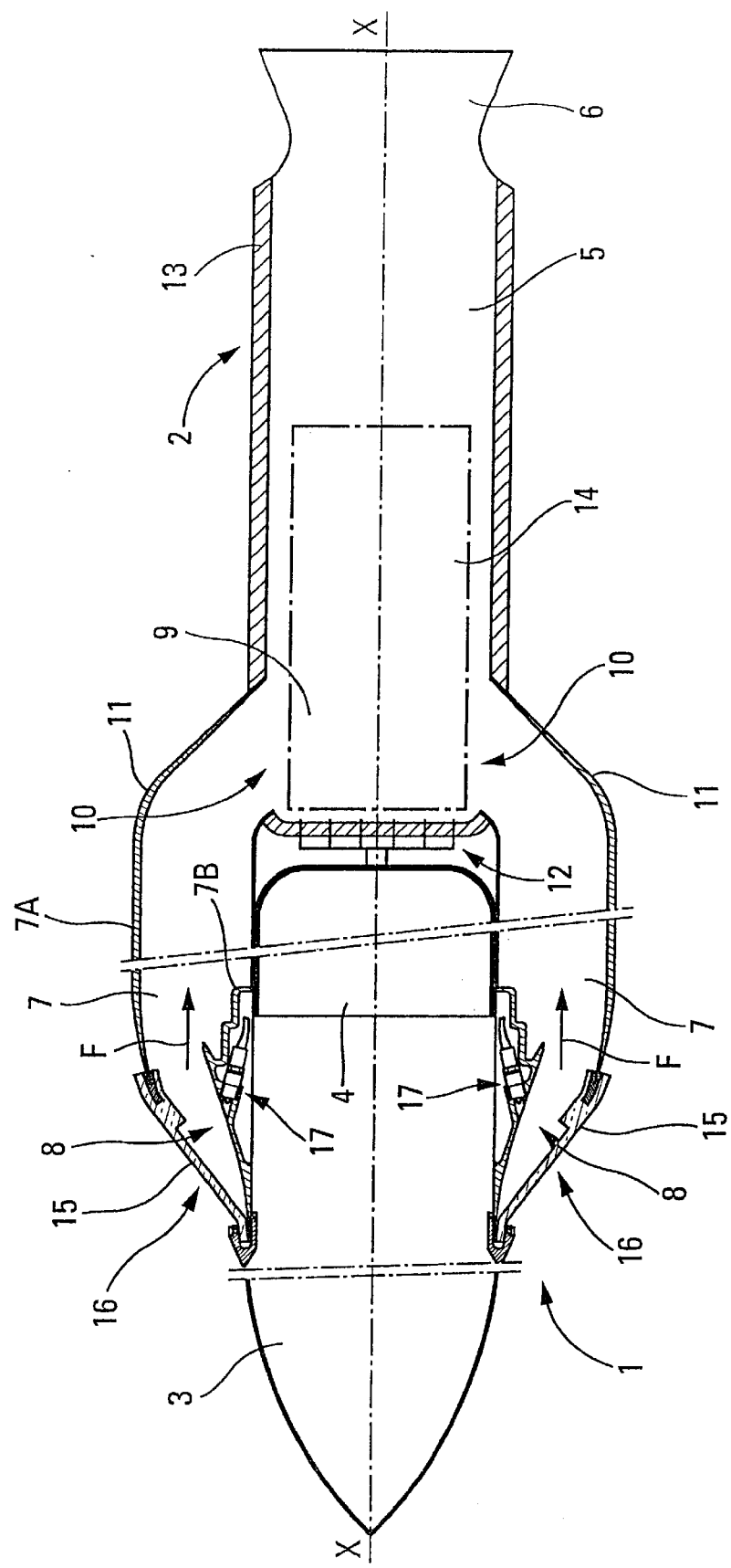
FIG. 1 shows diagrammatically, in partial longitudinal section, a missile equipped with a ramjet of known type, the air-intake ducts of which are provided with blanking caps forming part of blanking-cap systems in accordance with the invention.

In FIG. 1 have been represented, diagrammatically, for the purposes of explanation, a missile 1, with longitudinal axis X—X, propelled by a ramjet 2 of known type.

The missile 1 includes a body 3 containing, among other things, the usual apparatus and charges (which are not represented since they are not involved with the invention) and a fuel tank 4, intended to feed the ramjet 2, and fixed at the rear part of the said body 3.

The ramjet 2 includes a combustion chamber 5, terminating at the rear in an ejection nozzle 6 and linked, at the front, to a plurality of air-intake ducts, of the air-scoop type 7.

The air scoops 7 are arranged at the periphery of the body 3 and are integral with it. Each of them, towards the front, includes an air-inlet orifice 8 and, towards the rear, opens out into the front part 9 of the combustion chamber 5 via an air-outlet orifice 10 of the scoop 7.

A bend 11 is provided in each air scoop 7 so as to connect the part of it which is fixed to the outer wall of the body 3 to the orifice 10 corresponding to the inlet of the combustion chamber 5.

In the vicinity of the front part 9 of the combustion chamber 5 a fuel-injection device 12 is provided. The device 12 is controlled by a fuel-regulation and feed device (not represented) carried by the body 3 and connected to the tank 4.

A thermal-protection lining 13 is provided on the inner walls of the combustion chamber 5.

The operation of the missile 1 is as follows.

Initially, after the release of the missile 1 from its carrier, the ramjet 2 not being in service, the missile 1 is moved by a consumable auxiliary thruster 14 (for example a powder charge) housed within the combustion chamber 5.

When the auxiliary thruster 14 is operating, the air scoops 7 are closed off, by blanking caps 15 forming part of blanking-cap systems 16 in accordance with the invention and detailed below.

At the end of the operation of the thruster 14, when the latter is completely consumed, the said blanking caps 15 are opened and the air penetrating (arrows F) into the air scoops 7 through the orifices 8 is led into the combustion chamber 5, through the orifices 10.

Moreover, also at the end of the operation of the consumable thruster 14, the feed and regulation device supplies the injection device 12 with fuel and the fuel is ignited. The ramjet then comes into operation and takes over from the thruster 14 (which has disappeared) in order to propel the missile 1.

The characteristics in accordance with the invention are described below, for a single blanking-cap system 16, it being understood that these characteristics exist for all blanking-cap systems 16 of the ramjet 2.

The said blanking-cap system 16 in accordance with the invention is of the type including:

the said blanking cap 15 which is produced from a frangible glass detailed below and which completely blanks off an orifice of the air scoop 7; and a destruction device 17 for destroying the said blanking cap 15 so as to open the said orifice.

According to the invention, the said blanking cap 16 is noteworthy (see FIG. 2) in that the said blanking cap 15 closes off the inlet orifice 8 into the air scoop 7 (illustrated by the walls 7A and 7B), which is situated upstream of the air scoop in the direction F of flow of the air in the said air scoop 7, and in that the said destruction device 17 comprises:

at least one projectile 18 which is capable of destroying the said glass blanking cap 15, when it is projected onto it; and a controllable projection means 19, which is capable of projecting the said projectile 18 and which is arranged outside the air scoop 7, while being oriented in such a way as to be able to project the said projectile 18 onto the said blanking cap 15.

The said blanking-cap system 16 in accordance with the invention exhibits numerous advantages. In particular:

as the projection means 19 is arranged outside the air scoop 7, it does not impede the flow of the combustion air, after the destruction of the blanking cap 15, in ramjet operation. The air scoop 7 is then completely freed;

as the destruction of the blanking cap 15 is carried out by the sending of a projectile 18, this destruction can be carried out without contact between the blanking cap 15 and the projection means 19 which can therefore be spaced away from the said blanking cap 15 and from the air scoop 7;

as the blanking cap 15 is produced from glass and by virtue of the effectiveness of the destruction device 17, the glass is broken up into small fragments which are removed by the combustion air and are ejected out of the ramjet 2, rearwards, via the air scoop 7, the combustion chamber 5 and the ejection nozzle 6. Consequently, the blanking cap 15 is completely removed after its destruction; and as the projection means 19 is situated towards the inside (of the ramjet) with respect to the blanking cap 15 forming an outer wall (since it blanks off the inlet orifice 8), the projectile 18 sent by the said projection means 19 is, after destruction of the blanking cap 15, ejected directly out of the ramjet 2 and of the missile 1.

Consequently, no risk exists that the said projectile 18 will damage the ramjet 2 or the missile 1.

Moreover, since, upon impact on the blanking cap 15, the projectile 18 loses a great deal of energy (the residual energy after the impact being very much less than 8 Joules in the preferred embodiment detailed below), it is no longer dangerous, after it has been ejected out of the ramjet 2, for objects (another missile, for example) or persons present in the immediate vicinity of the said ramjet 2.

Figure 2:
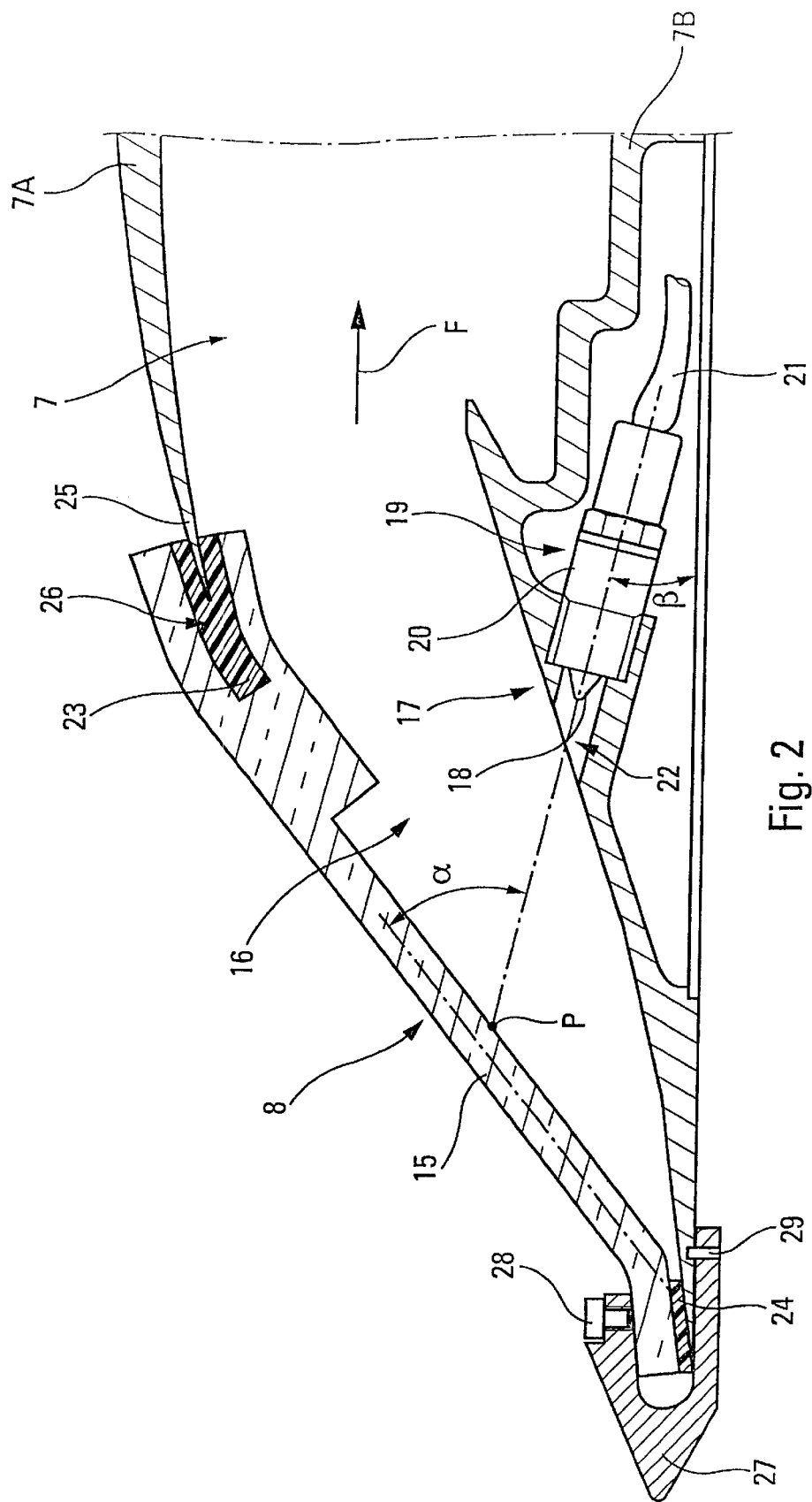
FIG. 2 illustrates, in section, a preferred embodiment of a blanking-cap system in accordance with the invention.

In the preferred embodiment represented in FIG. 2, the means 19 which is intended to project the projectile 18 onto the blanking cap 15 is produced in the form of an ordinary pyrotechnic striker 20, of which a lead 21 has been represented partially, this lead making it possible to transmit the order for causing the triggering of the said striker 20.

As can be seen in FIG. 2, the projection means 19 presents an angle $\beta$ with the longitudinal axis of the air scoop, and thus with the longitudinal axis X—X of the ramjet 2.

According to the invention, an angle $\beta$ can be chosen making it possible to optimize the position of the point P of impact of the projectile 18 on the blanking cap 15.

The said projection means 19 is preferably oriented in such a way that the impact P is located at a spot where the complete destruction of the blanking cap 15 is easiest, that is to say generally close to the center of the said blanking cap 15.

By way of example, the angle $\beta$ may lie between 10° and 20°, and the angle of impact $\alpha$ (between the projection direction and the plane of the blanking cap 15) may lie between 40° and 55°.

The glass of the blanking cap 15 is preferably an ordinary toughened glass, exhibiting a rupture stress of at least 190 Mpa, as well as the following characteristics:

thickness e=8 mm nominal rupture stress Rm=250 Mpa

Young's modulus E=72000 Mpa density d=2.5

Moreover, the projectile 18 is, preferably, a pointed metal bullet (see FIG. 2). It may also take the form of a spherical bullet or a bullet exhibiting another shape.

The destruction system 16 further includes a straight-line guide 22 for guiding the said projectile 18, the straight-line guide being produced in the form of a channel 22, one end of which is situated facing the said projection means 19 and the other end of which is directed towards the said blanking cap 15, which makes it possible to optimize the precision of the impact P of the projectile 18 on the blanking cap 15.

Moreover, this straight-line guide 22 makes it possible to maintain a high speed of the projectile 18, generally close to 350 m/s. After the impact, the speed is greatly reduced, generally to close to 25 m/s.

As can be seen in FIGS. 1 and 2, the blanking cap 15 corresponds to an extension (making it possible to create a geometric continuity) of the outer wall 7A of the air scoop 7, in the region of the inlet orifice 8.

Thus, during flight, the flow of the air is not disturbed by a geometric discontinuity, and can slip easily over the outer faces of the blanking cap 15 and of the wall 7A in particular, which makes it possible to reduce drag.

Furthermore, as can be seen in FIG. 2, the glass of the blanking cap 15 is fixed onto the ramjet by the interposition of elements 23 and 24 made of elastic material, for example made of rubber, which makes it possible to damp the vibrations and the shocks.

By virtue of this reduction in the vibrations and in the shocks, a very slight thickness of fairing lip 25 can be provided.

It will be noted that the blanking cap 15 is fixed:

in the region of the lip 25, by this lip 25 and the elastic element 23 being sunk into a recess 26 of the blanking cap 15; and at the other end, by a flange 27 which surrounds the corresponding end of the blanking cap 15 and which is held by screws 28 and pins 29.

Needless to say, the blanking-cap system 16 in accordance with the invention can be applied to other types of conduits, and not only to air scoops 7.

What is claimed is:

1. A blanking-cap system for an inlet orifice of a combustion-air intake duct into a combustion chamber of a ramjet, said ramjet being operable (i) in an initial phase of operation corresponding to a speeding-up of said ramjet, as a rocket by virtue of a consumable auxiliary thruster arranged in said combustion chamber, and (ii) when said ramjet reaches a predetermined speed, as a ramjet proper with injection of fuel and of combustion air into said combustion chamber, and said blanking-cap system including:

at least one glass blanking cap that is operable to completely blank off said inlet orifice, during said initial phase of operation as said rocket, and at least one destruction device that is operable to destroy said glass blanking cap to open said inlet orifice for operation as said ramjet, wherein said glass blanking cap blanks off said inlet orifice into said combustion-air intake duct, up-stream thereof in a direction of flow of said combustion air into said combustion-air intake duct, and wherein said destruction device comprises:

at least one projectile that is operable to destroy said glass blanking cap when said projectile is projected onto said glass blanking cap, and a controllable projection means for projecting said projectile, said controllable projection means being disposed outside said combustion-air intake duct and oriented to project said projectile onto said glass blanking cap such that, after destruction of said glass blanking cap, said projectile is ejected directly out of said ramjet.

2. The blanking-cap system of claim 1, wherein said controllable projection means is oriented to project said projectile substantially at a center of said glass blanking cap.

3. The blanking-cap system of claim 1, further comprising a straight-line guide forming a channel that guides said projectile, wherein one end of said channel is disposed to face said projection means and another end of said channel is directed towards said glass blanking cap.

4. The blanking-cap system of claim 1, wherein said projection means is a pyrotechnic striker.

5. The blanking-cap system of claim 1, wherein said projectile is a pointed metal bullet.

6. The blanking-cap system of claim 1, wherein said glass blanking cap comprises toughened glass having a rupture stress of at least 190 Mpa.

7. The blanking-cap system of claim 1, wherein said glass blanking cap corresponds to an extension of an outer wall of said ramjet in a region of said inlet orifice.

8. The blanking-cap system of claim 1, further comprising a fixing means, made of elastic material, for fixing said glass blank cap onto said inlet orifice.

9. A ramjet including a combustion chamber, provided with a duct for taking combustion air into a combustion chamber, and a blanking-cap system for an inlet orifice of a combustion-air intake duct, wherein said blanking-cap system is as specified under claim 1.

10. A missile that includes a ramjet according to claim 9.

* * * * *